United States Patent
Gurley et al.

(10) Patent No.: US 10,625,588 B2
(45) Date of Patent: Apr. 21, 2020

(54) VEHICLE ROOF-MOUNTED SHADING APPARATUS

(71) Applicant: Shady Spot, Inc., Piedmont, SC (US)

(72) Inventors: Winifred Gurley, Piedmont, SC (US); Paul Gurley, Piedmont, SC (US)

(73) Assignee: CARBRELLA, INC., Piedmont, SC (US)

( * ) Notice: Subject to any disclaimer, the term of this patent is extended or adjusted under 35 U.S.C. 154(b) by 0 days.

(21) Appl. No.: 15/598,363

(22) Filed: May 18, 2017

(65) Prior Publication Data

US 2017/0334270 A1 Nov. 23, 2017

Related U.S. Application Data

(60) Provisional application No. 62/339,148, filed on May 20, 2016.

(51) Int. Cl.
| | | |
|---|---|---|
| *B60J 3/00* | (2006.01) | |
| *B60J 3/02* | (2006.01) | |
| *B60J 11/04* | (2006.01) | |

(52) U.S. Cl.
CPC ..................... *B60J 11/04* (2013.01)

(58) Field of Classification Search
CPC ............... B60J 3/002; B60J 3/02; B60J 11/04
USPC .................................................. 296/136.12
See application file for complete search history.

(56) References Cited

U.S. PATENT DOCUMENTS

| | | | |
|---|---|---|---|
| 3,952,758 | A | 4/1976 | Addison |
| 3,957,301 | A | 5/1976 | Huber |
| 4,848,827 | A | 7/1989 | Ou |
| 4,929,016 | A | 5/1990 | Kastanis |
| 5,433,499 | A | 7/1995 | Wu |
| 5,762,393 | A | 6/1998 | Darmas, Sr. |
| 6,012,759 | A | 1/2000 | Adamek |
| 6,206,451 | B1 | 3/2001 | Maano |
| 6,536,829 | B2 | 3/2003 | Schlecht et al. |
| 6,935,674 | B1 | 8/2005 | Campos |
| 7,150,306 | B2 | 12/2006 | Ghazali |
| 7,337,793 | B2 | 3/2008 | Chen |
| 7,780,220 | B2 | 8/2010 | Aqeel |
| 8,276,607 | B2 | 10/2012 | Kim |
| 8,308,217 | B2 | 11/2012 | Patel |
| 8,419,107 | B2 | 4/2013 | Manchanda |
| 8,651,555 | B2 | 2/2014 | Chan |
| 8,662,563 | B1 | 3/2014 | Hardenbrook |
| 8,752,880 | B1 | 6/2014 | Morazan |
| 9,080,374 | B2 | 7/2015 | Gavish |
| 2002/0139403 | A1 | 10/2002 | Shi |
| 2004/0135393 | A1 | 7/2004 | Neuer |
| 2005/0121937 | A1 | 6/2005 | Hudgins |

(Continued)

FOREIGN PATENT DOCUMENTS

| | | |
|---|---|---|
| AU | 2005100553 | 8/2005 |
| CN | 100577459 | 1/2010 |

(Continued)

*Primary Examiner* — Joseph D. Pape
*Assistant Examiner* — Dana D Ivey
(74) *Attorney, Agent, or Firm* — Burr & Forman, LLP; Douglas L. Lineberry

(57) ABSTRACT

A self-contained, self-extending, roof-mounted shading apparatus, capable of both vertical and horizontal movement to provide shade for a vehicle.

11 Claims, 21 Drawing Sheets

(56) References Cited

U.S. PATENT DOCUMENTS

| | | | |
|---|---|---|---|
| 2005/0194414 A1* | 9/2005 | Lynch | B60R 9/055 224/401 |
| 2006/0162873 A1 | 7/2006 | Dao | |
| 2007/0215298 A1 | 9/2007 | Chen | |
| 2009/0038766 A1 | 2/2009 | Smith, Jr. | |
| 2009/0072578 A1* | 3/2009 | Wang | B60J 11/06 296/136.12 |
| 2013/0118696 A1* | 5/2013 | Gavish | E04F 10/0603 160/328 |

FOREIGN PATENT DOCUMENTS

| | | |
|---|---|---|
| CN | 201511794 | 6/2010 |
| CN | 201872580 | 6/2011 |
| CN | 102845965 | 1/2013 |
| CN | 202727946 | 2/2013 |
| CN | 202774578 | 3/2013 |
| CN | 103978876 | 8/2013 |
| CN | 203110897 | 8/2013 |
| CN | 103332095 | 10/2013 |
| CN | 103448523 | 12/2013 |
| CN | 103738150 | 4/2014 |
| DE | 19736958 | 3/1999 |
| WO | WO2004033240 | 4/2004 |
| WO | WO2013042871 | 3/2013 |
| WO | WO2014019107 | 2/2014 |
| WO | WO2015010587 | 1/2015 |
| WO | WO2015121694 | 8/2015 |

* cited by examiner

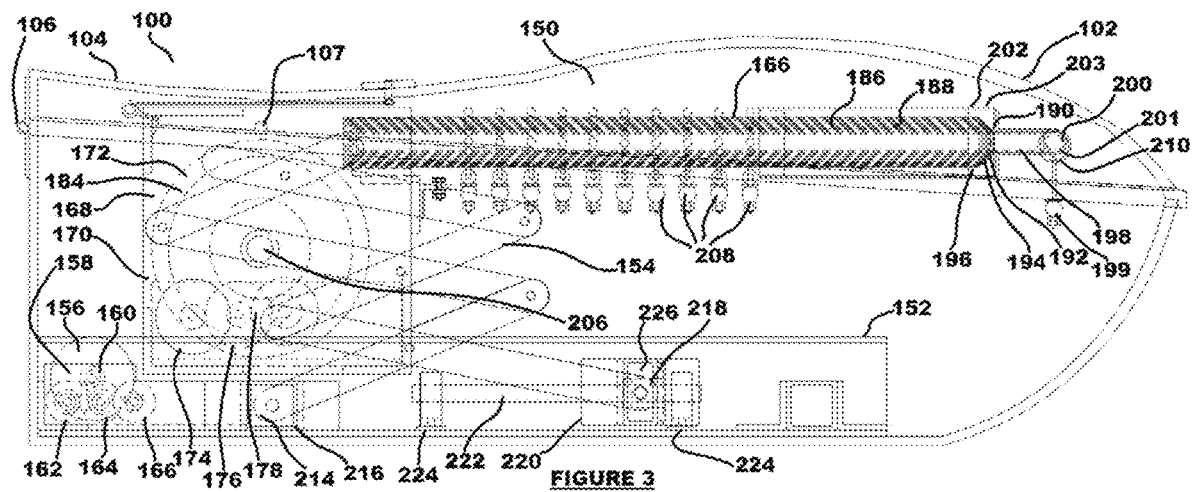

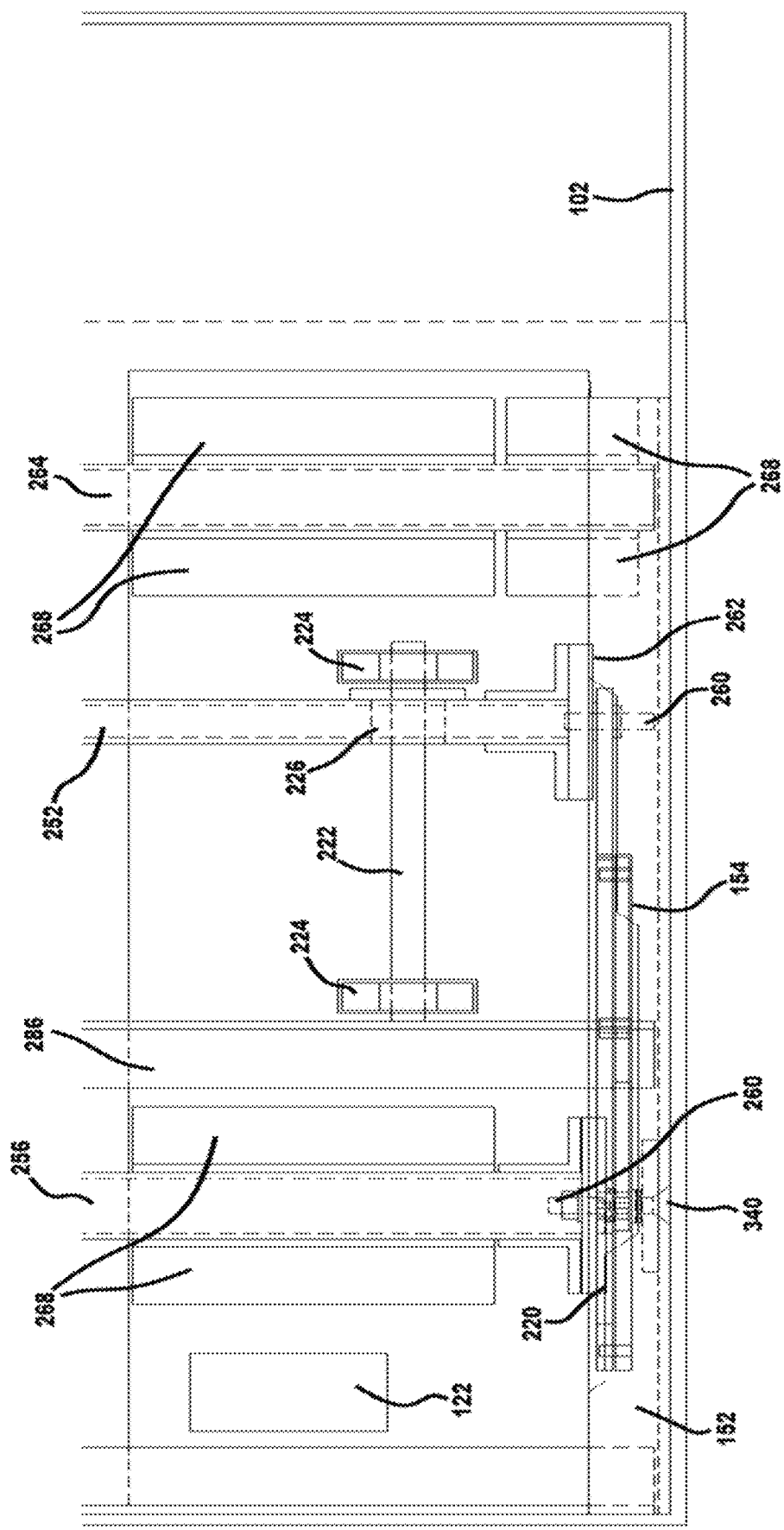

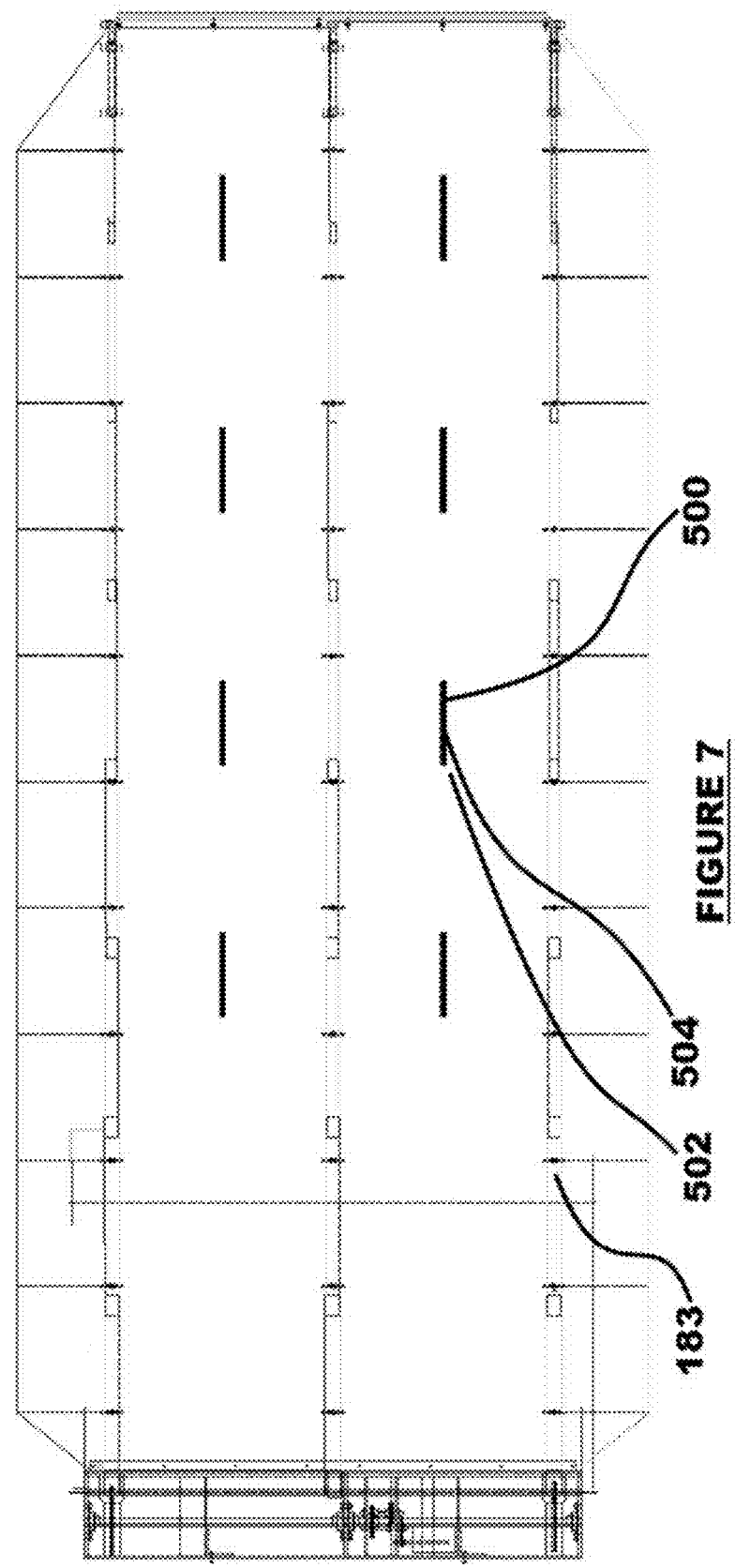

ESTIMATED VEHICLE INTERIOR AIR TEMPERATURE vs ELAPSED TIME

| Outside Air Temp (F°) | 70 | 75 | 80 | 85 | 90 | 95 |
|---|---|---|---|---|---|---|
| Elapsed Time | Inside Air Temperature (F°) | | | | | |
| After 10 minutes | 89 | 94 | 99 | 104 | 109 | 114 |
| After 20 minutes | 99 | 104 | 109 | 114 | 119 | 124 |
| After 30 minutes | 104 | 109 | 114 | 119 | 124 | 129 |
| After 40 minutes | 108 | 113 | 118 | 123 | 128 | 133 |
| After 50 minutes | 111 | 116 | 121 | 126 | 131 | 136 |
| After 60 minutes | 113 | 118 | 123 | 128 | 133 | 138 |
| After 1 hour | 115 | 120 | 125 | 130 | 135 | 140 |

FIGURE 8

VEHICLE ROOF-MOUNTED SHADING APPARATUS

BACKGROUND OF THE INVENTION

1) Field of the Invention

The present invention relates to a vehicle roof-mounted shading apparatus, capable of both vertical and horizontal movement, to shade a vehicle from the sun.

2) Description of Related Art

The interior of a car parked outdoors on a hot sunny day can reach very high temperatures in a short period of time. This drastic temperature increase is caused by a combination of hot temperatures outside the car and lack of proper ventilation for the hot air to escape from within and surrounding the exterior of the car. Ultraviolet radiation from the sun also enters through the windshields and windows and heats the air in the car. The front windshield may also act like a magnifying glass, intensifying sun rays.

These extreme conditions not only cause discomfort to the driver and passengers upon re-entering, but may also damage the interior of the car. Two methods that are normally used to reduce temperature build-up in a vehicle are tinting the windows or using sunshades. Tinting the window involves permanently installing a film on the window of the car. In some countries, this is not permitted by law.

There have been a number of efforts to cover parked cars and protect them from very high internal temperatures caused by the sun's rays. To date, these efforts all have had designs that make them best suited for long term parking because of the difficulties one would have in using the various systems. Most sit on the car surface, which is not good for the vehicle's finish and traps heat at the vehicle exterior.

Several efforts have tried to address all problems that could occur, such as rain, snow, hail, sleet, and wind as well as sun rays. Some devices have to be removed and stored in the trunk to operate the car. Other applications have to be wired into the car's electrical system or have parts welded onto the car roof or trunk or would need several people to deploy the device for use. For instance, Patel, U.S. Pat. No. 8,308,217, provides a sun shade for interior use of a vehicle. The shade includes a scissors type extension mechanism but lacks internally supported tubing and is incapable of both vertical and horizontal movement with respect to a vehicle.

Gavish, U.S. Pat. No. 9,080,374, discloses a sheltering device for use with a vehicle's roof. The device uses non-parallel extension in order to form a rhomboid shaped covering. The device lacks internally supported tubing and is not capable of both vertical and horizontal movement with respect to a vehicle.

Morazan, U.S. Pat. No. 8,752,880, provides a sunshade that forms a surrounding canopy for a vehicle. The device lacks internally supported telescoping rods, cannot provide both vertical and horizontal movement of the shade with respect to the vehicle, and requires external support wires to maintain the canopy shape.

CN 103978876 provides a dual extension canopy with a "clam shell" design that spreads in opposite directions to provide shade. The device lacks internally supported telescoping rods and is incapable of both vertical and horizontal movement with respect to the vehicle roof. Further, the device uses guide wires to maintain the shade's shape with respect to the vehicle.

WO 2014/019107 discloses a car sunshade comprising a frame and cover. The devices uses four extendable rods to cover the roof of a vehicle. This design, too, lacks both horizontal and vertical movement with respect to a vehicle and lacks an internally supported telescoping rod system.

CN 201872580 discloses a horizontally extending car shade using scissoring arms to provide a vehicle sunshade. The device is incapable of vertical movement with respect to a vehicle roof and lacks an internally supported telescoping rod system.

Ghazali, U.S. Pat. No. 7,150,306, discloses a collapsible car shade assembly that uses fixed rods to raise a canopy over a vehicle. The disclosure lacks horizontal movement, is not self-contained, and is not roof mounted but instead requires use of a vehicles hood and trunk to provide shade in association with four mounts fixed to the trunk and hood of the vehicle. Further, the device lacks an internally supported telescoping rod system.

Addison, U.S. Pat. No. 3,952,758, discloses a canopy affixed to the roof of a vehicle. The canopy device is not self-extendable or self-contained. Instead, rigid poles and mounts are affixed to numerous locations of the vehicle roof and the canopy is rigidly assembled from these mounts and lacks an internally supported telescoping rod system.

What is needed in the art is a self-contained, self-supported, self-extending, roof-mounted or roof-rack-mounted shading apparatus, that is attractive and capable of both vertical and horizontal movement to provide shade for a vehicle.

SUMMARY OF THE INVENTION

In a first embodiment, a vehicle sun shade device is provided. The device includes a containment case, a housing, a sunshade material, at least one vertical extension unit for raising the housing and sunshade material from the containment case up from a vehicle roof, at least one horizontal extension unit integrated with the housing. The at least one horizontal extension unit comprises at least one collapsible tube containing an internal extender. The internal extender uncoils when the horizontal extension unit extends and the internal extender recoils when the horizontal extension unit retracts. The horizontal extension unit extends the sunshade material and retraction of the at least one horizontal extension unit retracts the sunshade. In a further embodiment, the sunshade material comprises a voltaic cell. In a still further embodiment, the sunshade material comprises a woven or nonwoven material which contains ultraviolet ray protection. Still further, the sunshade material defines a space between the canopy and the vehicle roof. In another embodiment, vertical raising of the vehicle sunshade device is achieved via at least one scissor bracket. In a yet further embodiment, the sunshade material is supported from the at least one collapsible tube. In another embodiment, the internal extender comprises a coiled strip. Still in yet another embodiment, the at least one collapsible tube is comprised of segments nested within one another. In a further embodiment, the internal extender is connected to a distal-most segment of the collapsible tube. Further still, upon retraction of the sunshade material, the sunshade material is gathered by a cuff. In a further embodiment, vertical and horizontal movement of the device is accomplished via at least one motor.

In an alternative embodiment, a system for providing shade to a vehicle is provided. The system includes a device shell, a vertical extension unit, a horizontal extension unit, a sunshade material, at least one collapsible tube formed from nested segments, and an extendable support positioned within the nested segments of the at least one collapsible tube. In a further embodiment, the system includes at least one motor for vertical and horizontal movement. In another embodiment, the extendable support is affixed to a distal segment of the at least one collapsible tube. In a further embodiment, the extendable support is a coiled strip. In a yet another embodiment, the device shell is hinged and includes a lid. Still further, the lid opens when the system raises vertically and closes when the system lowers vertically. In a further embodiment, vertical extension is achieved via at least one scissor bracket. In an even further embodiment, the system includes at least two vertical extension units.

BRIEF DESCRIPTION OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein:

FIG. 3 illustrates an interior profile view of a self-contained sunshade of the current disclosure.

FIG. 4C shows a second enlarged view of a section of FIG. 4.

FIG. 7 shows a top down view of a shade material of the current disclosure fully extended.

FIG. 8 shows an American Automobile Association table of vehicle interior temperatures versus elapsed time.

Figure 1:
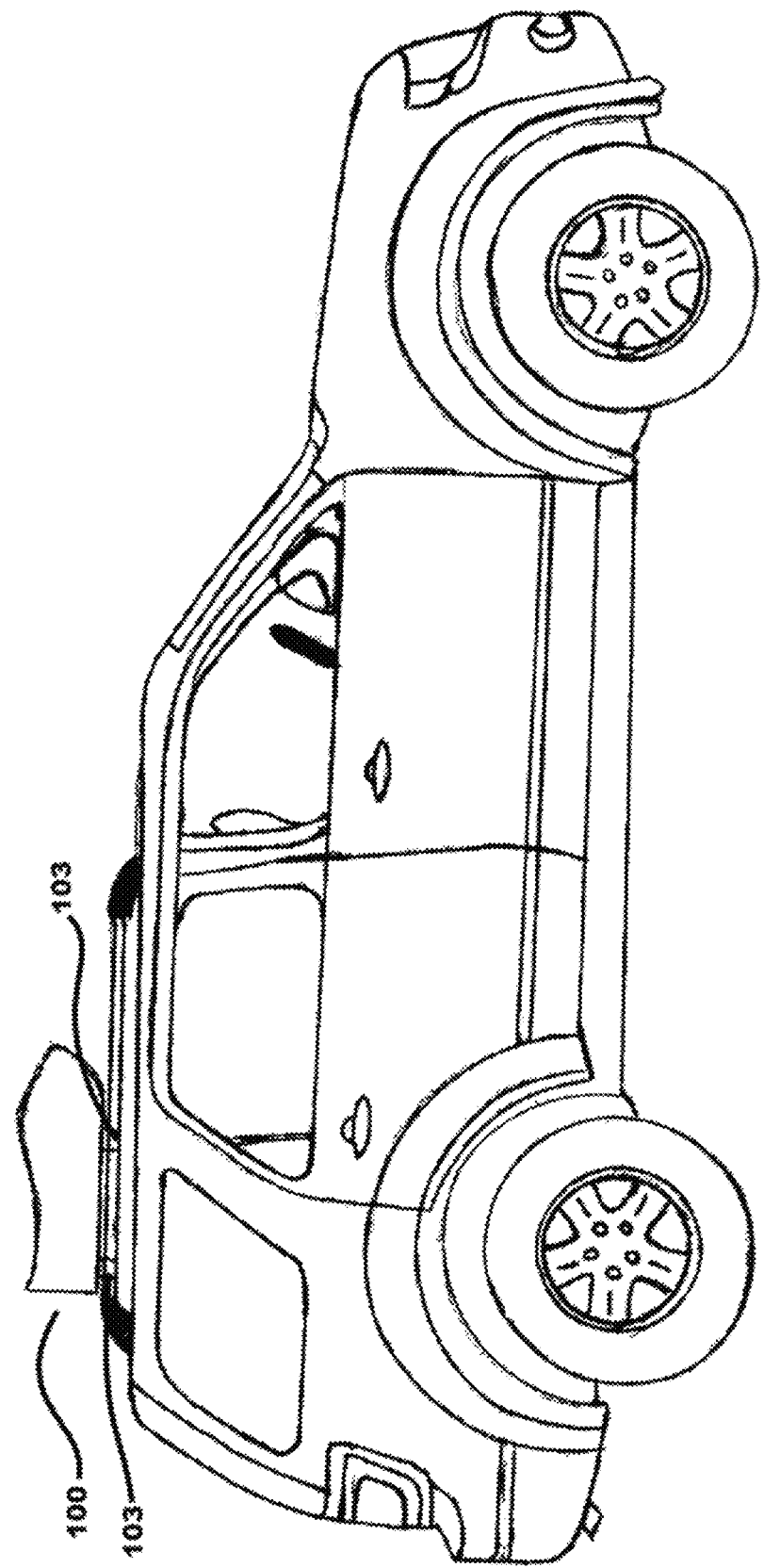
FIG. 1 illustrates one embodiment of a top down view of self-contained sun shade device of the current disclosure.

It will be understood by those skilled in the art that one or more aspects of this invention can meet certain objectives, while one or more other aspects can meet certain other objectives. Each objective may not apply equally, in all its respects, to every aspect of this invention. As such, the preceding objects can be viewed in the alternative with respect to any one aspect of this invention. These and other objects and features of the invention will become more fully apparent when the following detailed description is read in conjunction with the accompanying figures and examples. However, it is to be understood that both the foregoing summary of the invention and the following detailed description are of a preferred embodiment and not restrictive of the invention or other alternate embodiments of the invention. In particular, while the invention is described herein with reference to a number of specific embodiments, it will be appreciated that the description is illustrative of the invention and is not constructed as limiting of the invention. Various modifications and applications may occur to those who are skilled in the art, without departing from the spirit and the scope of the invention, as described by the appended claims. Likewise, other objects, features, benefits and advantages of the present invention will be apparent from this summary and certain embodiments described below, and will be readily apparent to those skilled in the art. Such objects, features, benefits and advantages will be apparent from the above in conjunction with the accompanying examples, data, figures and all reasonable inferences to be drawn therefrom, alone or with consideration of the references incorporated herein.

DETAILED DESCRIPTION OF A PREFERRED EMBODIMENT

With reference to the drawings, the invention will now be described in more detail. Unless defined otherwise, all technical and scientific terms used herein have the same meaning as commonly understood to one of ordinary skill in the art to which the presently disclosed subject matter belongs. Although any methods, devices, and materials similar or equivalent to those described herein can be used in the practice or testing of the presently disclosed subject matter, representative methods, devices, and materials are herein described.

Unless specifically stated, terms and phrases used in this document, and variations thereof, unless otherwise expressly stated, should be construed as open ended as opposed to limiting. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

The current disclosure is directed to a shade producing device that protects both the exterior and interior of a vehicle. This device is meant to be used anytime a car is parked in hot sunshine where the internal temperature may climb to extremely uncomfortable levels. This disclosure is designed to be both quick and requiring little effort for the user to deploy and retract and takes no more work than to press a button and slip two stretchable cords with hooks or clamps on their ends into the wheel wheels or other point of affixture, if desired. This is a definite advantage for a parent with small children, or when someone is dressed in one's better attire, or for someone with limited physical abilities.

This current disclosure provides a quick and effortless means by which one can park a car, push a button, slip two cords with hooks onto the car wheel well or other structure on the vehicle, if desired when windy, and go into work, shopping, church, a restaurant, a meeting, sports venues, classes, entertainment, etc., and return to a car that is not super-heated and burning to the touch. This invention may either be integral with a vehicle roof or, in another embodiment, may be removably affixed to a roof rack or added accessory rack by locked clamps, for purposes of example only and not intended to be limiting, four clamps, that swivel for either orientation of the racks—whether in a transverse or longitudinal direction on the roof. The current disclosure is designed for easy consumer installation and may be moved from car to car as desired.

The device may be powered by preferably two battery-operated motors and a readily accessible rechargeable battery. This battery could be re-charged by an adaptor connected to household current, the car's electrical system, or to a solar power source, or some other power source such as but not limited to a generator. In a further embodiment, an alternative power source may be provided in the event the battery associated with the device is not charged. This other power source could be but is not limited to the car battery accessed by means of the car accessory port with proper adaptor and a D.C. power cord stored in the device. In an additional embodiment, a remote control may be incorporated to activate sun shade 100 and either extend or retract the device, as desired.

The current disclosure is directed to a vehicle roof-mounted shading apparatus which may use fabrics that dramatically reduce the heat from the sun's rays and maintains the internal temperature of the vehicle about 20% cooler than it would be without the shade. In one embodiment, the disclosure preferably uses two motors with a rechargeable battery to raise and lower the brackets and housing and shading fabric and deploy and retract telescoping tubes supporting the shading fabric across the vehicle roof. In an alternative embodiment, a manual crank or lever could be used in place of an electric motor to raise the assembly and the fabric could be pulled from the folded position forward across the roof by a handle affixed to the leading edge. The motors may each be powered by a designated rechargeable battery, which may be recharged by household current, vehicle current, solar power, or some other power source, using the proper adapter for each type.

In one embodiment, two motor-driven scissors lift brackets, one on each side of the device case, raise the extension/retraction apparatus into an elevated position above the vehicle roof so as to have air circulation between the sunshade and vehicle in order to not trap heat on the vehicle roof surface, thereby providing an insulating cushion of air. In one embodiment, scissors lift brackets have a moveable section that moves backward and forward within the case as they raise or lower the housing assembly. The motor driven scissors lift brackets may deploy at a backwards angle, possibly at a 50 degree angle, at once pushing open the lid of the case, which angles backwards also, so as to provide shade for the oftentimes very large surface area of some vehicles' back windows. In a further embodiment, the lift brackets may have affixed to them lugs or similar protrusions to keep the housing assembly parallel to the roof of the vehicle, or the tilt could be controlled by the connection to the housing via anchors anchored to the fixed and stationary components in the base of the device case.

Figure 2:
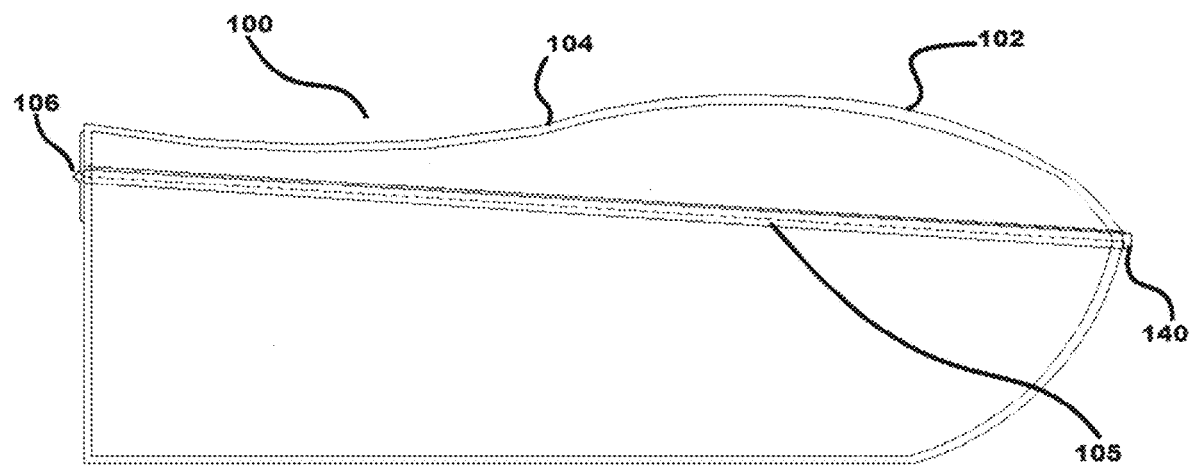
FIG. 2 shows a side view of one embodiment of a self-contained sun shade of the current disclosure.

FIG. 1 illustrates one embodiment of a side view of self-contained sun shade 100 positioned on a vehicle. FIG. 2 shows a side view of one embodiment of a self-contained sun shade 100 which may be contained in case 102 and comprise a case lid 104 and case hinge 106. Case 102 may also include a flange 105. Case lid 104 may be configured to be pushed open when self-contained sun shade 100 is deployed. In one embodiment, lid 104 may be pushed open by raising extension/retraction assembly 168, see FIG. 3, lid 104 may be pushed to preferably angle backwards away from interior 150 of case 102. Case 102 may employ vehicle locking mechanisms 103, which for purpose of example only and not intended to be limiting, comprise swivel clamps that lock onto a vehicle's factory-installed roof rack or an added accessory rack and would fit both transverse and longitudinal rack orientation. Case 102 may be formed of a rigid, lightweight, durable material such as a high-quality ABS plastic, other plastics, resins such as thermoplastic resin, polycarbonates, metals, synthetics, wood, or other materials as known to those of skill in the art that may hold the components of sun shade 100. In one embodiment, case 102 may be crafted from aluminum for durability and long life. In another embodiment, case 108 may be colored, such as black, titanium or other colors, possibly to complement the color of the vehicle. Case 108 should be designed so that its interior, discussed infra, forms a strong support of the working parts. The interior may be formed from materials such as steel, stainless steel, galvanized steel, enamel-coated or powder-coated steel, aluminum or other materials known to those of skill in the art that are strong and preferably rust-resistant and lightweight.

In a further embodiment, sun shade 100 may include a case lock 140 for securing the device and preventing unauthorized access to the interior 116 of case 108. Shading fabric 118 is shown extended from case 108. Telescoping tubes 120 are shown extending from case 108. In one embodiment, case 108 device may contain circuitry to control power to the electric case lock 140, the motor powering the scissors lift brackets, and the motor powering the rotating shaft which deploys the telescoping tubes.

Figure 2B:
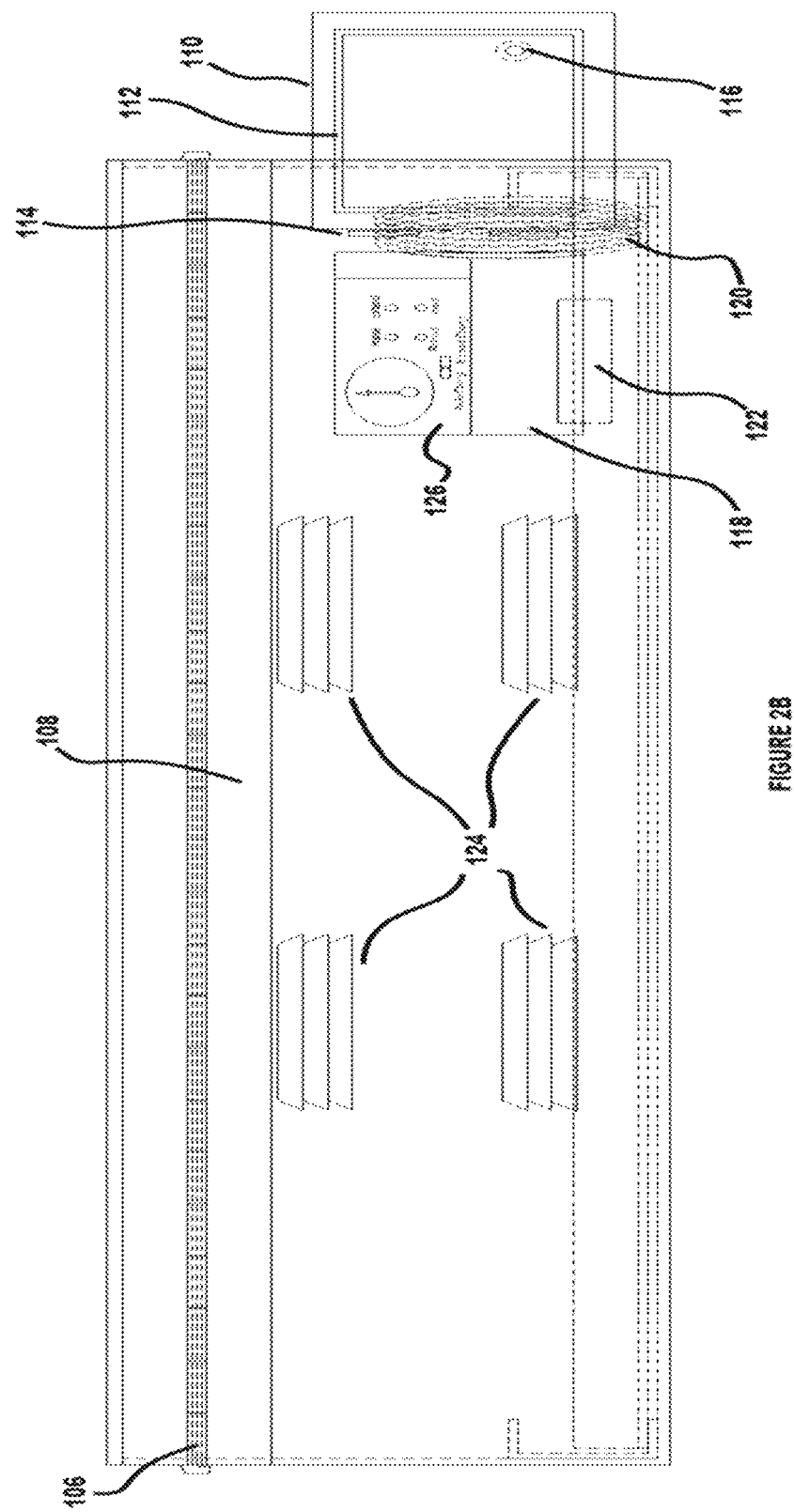
FIG. 2B shows a close-up view of a side of a self-contained sun shade of the current disclosure.

FIG. 2B shows a close-up view of a side 108 of self-contained sun shade 100. FIG. 2B. Either side of sun shade 100 may be arranged as shown in FIG. 2B, including both sides of self-contained sun shade 100. FIG. 2B shows that side 108 may contain a door 110, which may include a weather seal 112 to seal out water and elements as well as a door hinge 114 to allow door 110 to open and close. Door 110 may also include a knob 116, or other means as known to those of skill in the art, to allow a user to open door 110 and to secure door 110 closed on side 108 of self-contained sun shade 100.

Door 110 covers control compartment 118. Control compartment 118 may include a power cord 120. Power cord 120 may allow self-contained sunshade 100 to be connected to external power sources if power is needed to be supplied to self-contained sun shade 100, such as in the case of battery 122 running out of power. Power cord 120 may be a DC power cord affixed with an appropriate adaptor for use in the car accessory port to power self-contained sunshade 100. Battery 122 may be a rechargeable battery such as a lead acid gel, lithium-ion, lithium-ion polymer, Nickel-Cadmium, or a Nickel Metal Hydride, as known to those of skill in the art. In use battery 122 would supply power to operate, deploy, and retract self-contained sunshade 100. Side 108 may also include ventilation openings 124 that allow air to pass into and out of self-contained sunshade 100. In one embodiment, ventilation openings 124 may be ridged vents which allow air but not water and debris to enter sunshade 100. Control panel 126 may be contained within control compartment 118.

Figure 2C:
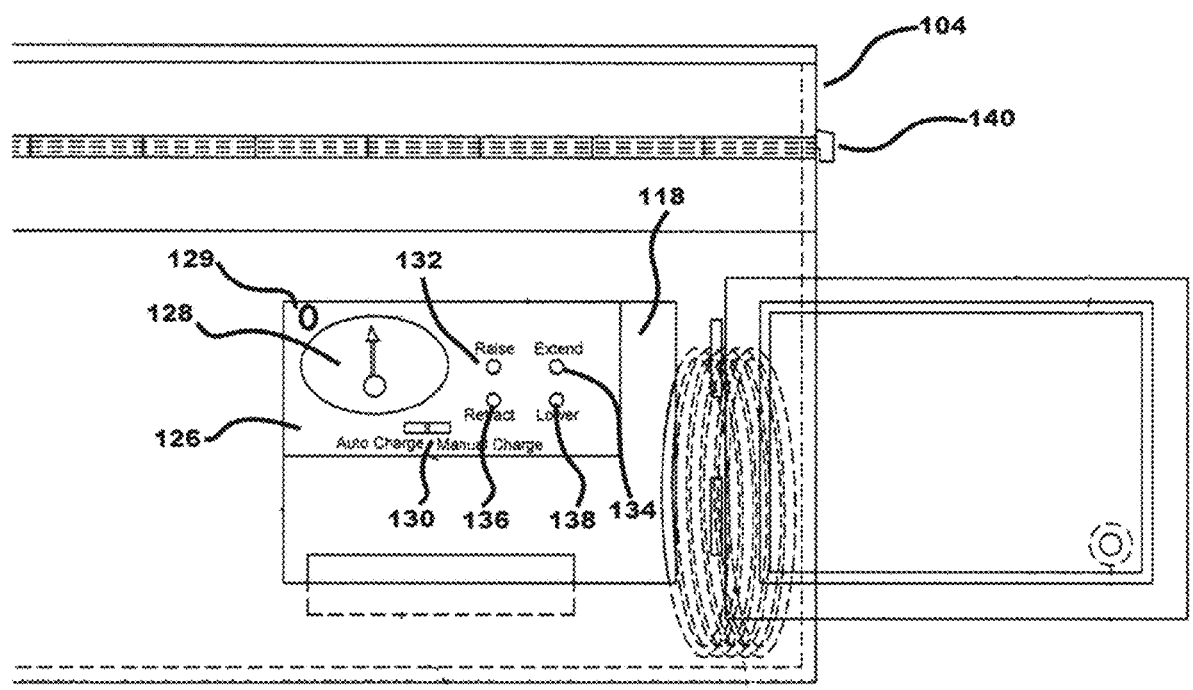
FIG. 2C shows a close up view of a control compartment and control panel of the current disclosure.

FIG. 2C shows a close up view of control compartment 118 and control panel 126. Control panel 126 may include a battery status indicator 128, a button 129 to activate battery status indicator 129, a switch 130 for selecting between power sources, such as battery and DC or between alternate sources such as solar cells and battery, etc. When using car battery power, or any power source, the sequence of functions could be initiated and terminated by circuitry either manually by possibly a switch located adjacent to the DC power cord connection point or by the remote control. In a preferred embodiment, lock-outs may be provided in the circuitry for the motors to prevent any function until the prior function has ended. For example, when the lift brackets and telescoping rods, discussed infra, are fully extended and in place, the connections in the motor may be broken and the function will stop when the power supply to the motor is interrupted.

Control panel may also contain a raise activator 132 to raise case lid 104, an extension activator 134 to extend the sunshade, not shown discussed infra, a retraction activator 136 to retract the sunshade after use, and a lower activator 138 to lower lid 104. Activators 132, 134, 136 and 138 may be switches or buttons as known to those of skill in the art and will operator a motor to effectuate their uses as described infra. Case 102 may also include a case lock 140 to secure self-contained sunshade 100 when not in use.

FIG. 3 shows an interior profile view of self-contained sunshade 100. Interior 150 of sunshade 100 may contain a channel 152 to secure ends of stationary transverse beam 256 and tube for motor screw anchor 264, a scissor lift bracket assembly 154, a scissor lift motor 156, which may be a 12 volt DC, 3000 rpm, with a ¼" diameter shaft, scissor lift motor 156 may be operatively engaged to lift gear assembly 158, that in one embodiment may contain first gear 160, 162, 164, and 166 to aid in raising and lowering sunshade extension/retraction assembly 168. While four gears are disclosed, the current disclosure is not limited to four gears and more or less gears may be included in gear assembly 158. Sunshade extension/retraction assembly 168 may contain an extension/retraction motor 170. Extension/retraction motor 170 may also be operatively connected to extension/retraction gear assembly 172, which may contain first extension/retraction gear 174, second extension/retraction gear 176, and third extension retraction gear 178, extension/retraction gear assembly 172 serves to provide a consistent, controlled extension/retraction speed in order to prevent sunshade material 180 from extending or retracting too quickly. While three extension/retraction gears are disclosed, the current disclosure is not limited to three extension/retraction gears and more or less gears may be included in extension/retraction gear assembly 172.

Sunshade material 180 may be made of various materials suitable for sunshades including cloth, mesh, fabric, netting, canvas, vinyl, resin, and polymer materials, such as Polytex. Further, woven and nonwoven materials may be used for the canopy. In one embodiment sunshade material 180 may be either woven acrylic or closely knitted polyester with an ultraviolet protection factor above 90% and block around 99% of the sun's radiant heat. Even the more tightly knitted mesh fabrics that have an ultraviolet protection factor of over 90% still allow air to circulate and keep the area underneath sunshade material 180 much cooler. Other fine fabrics that could be used are made from polyethylene or fiberglass or any of a number of cottons such as canvas or duck. Other materials that could be used include but are not limited to woven polyesters, fabrics treated to resist mildew and fading—which the preferred fabrics are, loose and tightly woven fabrics, fabrics dyed to match the vehicle, waterproof fabrics, nylons or radiant barrier or heat reflecting shade materials. In an additional embodiment, the shade may be made from rigid or semi-rigid strips such as bamboo, vinyl, synthetics, treated fabrics, nonwovens, etc. The shade may also be formed from vinyl, shade netting, etc., as known to those of skill in the art. In further embodiments, radiant barrier materials may be employed to reflect sunlight. In a preferred embodiment a solar screen such as Textilene®, available from Arizona Sun Supply, Inc., may be used. In a further preferred embodiment, Sunbrella® shade sail materials, available from Custom Shade Sails, Chesterfield, Mo., may be used.

One significant flaw with prior art devices is that these mechanisms do not allow for practical, efficient sunshade material 180. Indeed, many prior art devices are simply nonfunctional: attempting to repeatedly extend and retract a cloth, fabric, mesh, or other type of material as suggested by these devices will not work. The cloth or fabric of the prior art devices is not guided into the various housings of the disclosures in an organized, and more importantly, perpetually repeatable way regardless of the number of extensions and retractions demanded of the device. Instead, the material is simply "bunched up" upon return to the housing, leading to storage issues and, ultimately, dissuading users from that particular device.

Figure 3B:
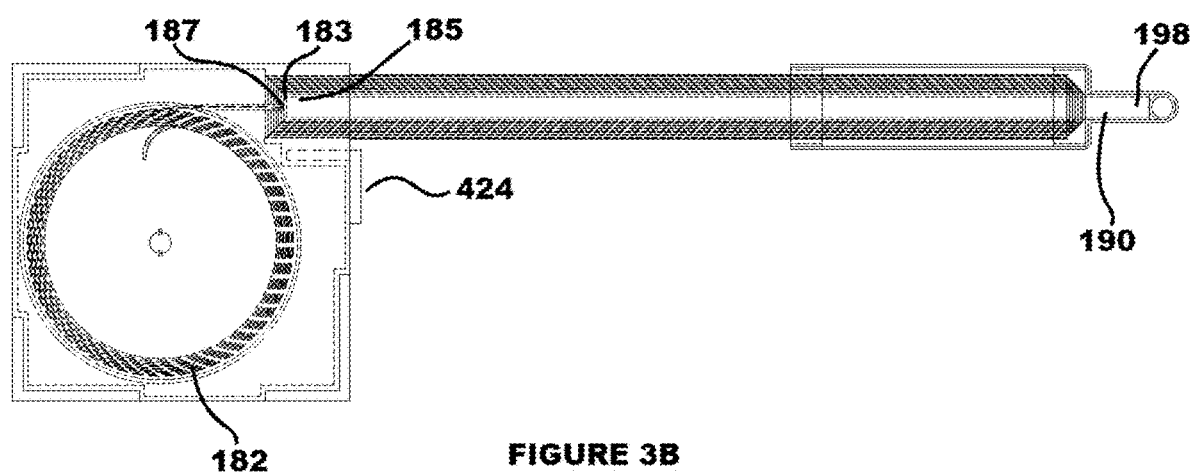
FIG. 3B shows a cut-away portion of FIG. 3 displaying a coiled strip of the current disclosure.
Figure 3C:
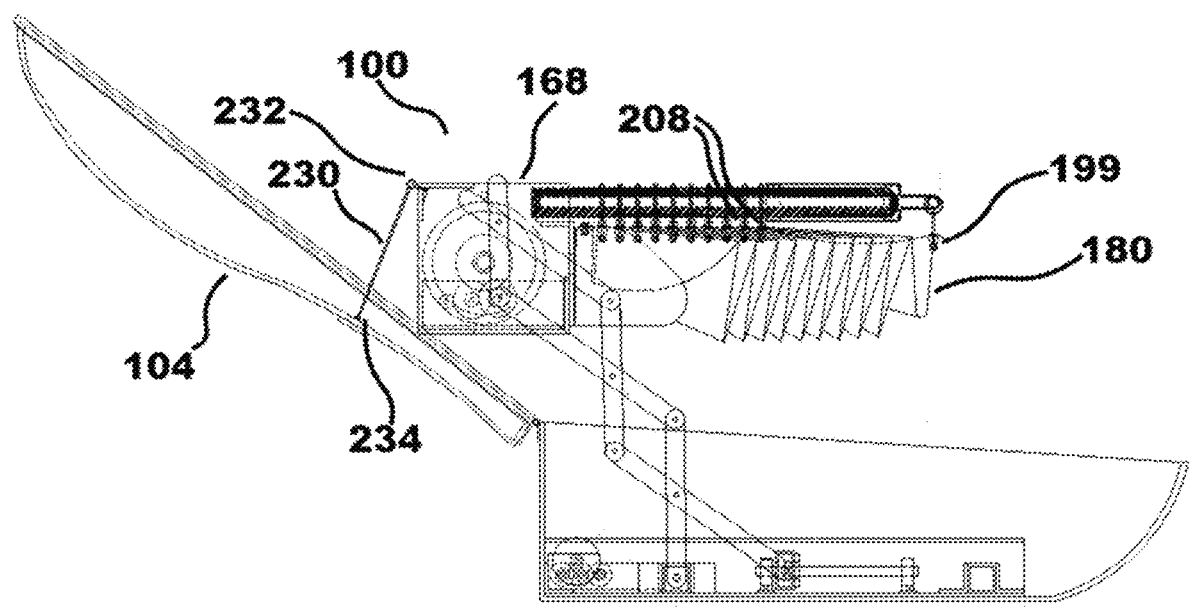
FIG. 3C shows a self-contained sunshade of the present disclosure in a raised, partially extended configuration.

Extension/retraction of sunshade material 180, see FIG. 3C, which shows self-contained sunshade with in a raised but not extended configuration, is effected by a coiled strip 182, see FIG. 3B, which shows a cut-away portion of FIG. 3 displaying coiled strip 182. Coiled strip 182 may comprise coiled wire, steel, fiberglass, carbon fiber, or any material strong enough to push and pull telescoping tubes 186 and flexible enough to coil and uncoil repeatedly, this includes metals, plastics, polymers, synthetics, etc., in a preferred embodiment, coiled strip 182 may be made from steel and is contained in strip housing 184. Coiled strip 182 may be affixed either permanently or removably, as known to those of skill in the art. When removably affixed, additional telescoping tubes 186 may be added, or removed, to either lengthen or shorten telescoping tube 186 with coiled strip 182 passing through any additional sections. Thus, the length of the deployed shading apparatus may vary. The device may be modified to fit any particular length of vehicle by adding or subtracting the number of telescoping tubes 186 that extend and retract while also either extending or reducing the length of the shading fabric to fit the vehicle.

Figure 3D:
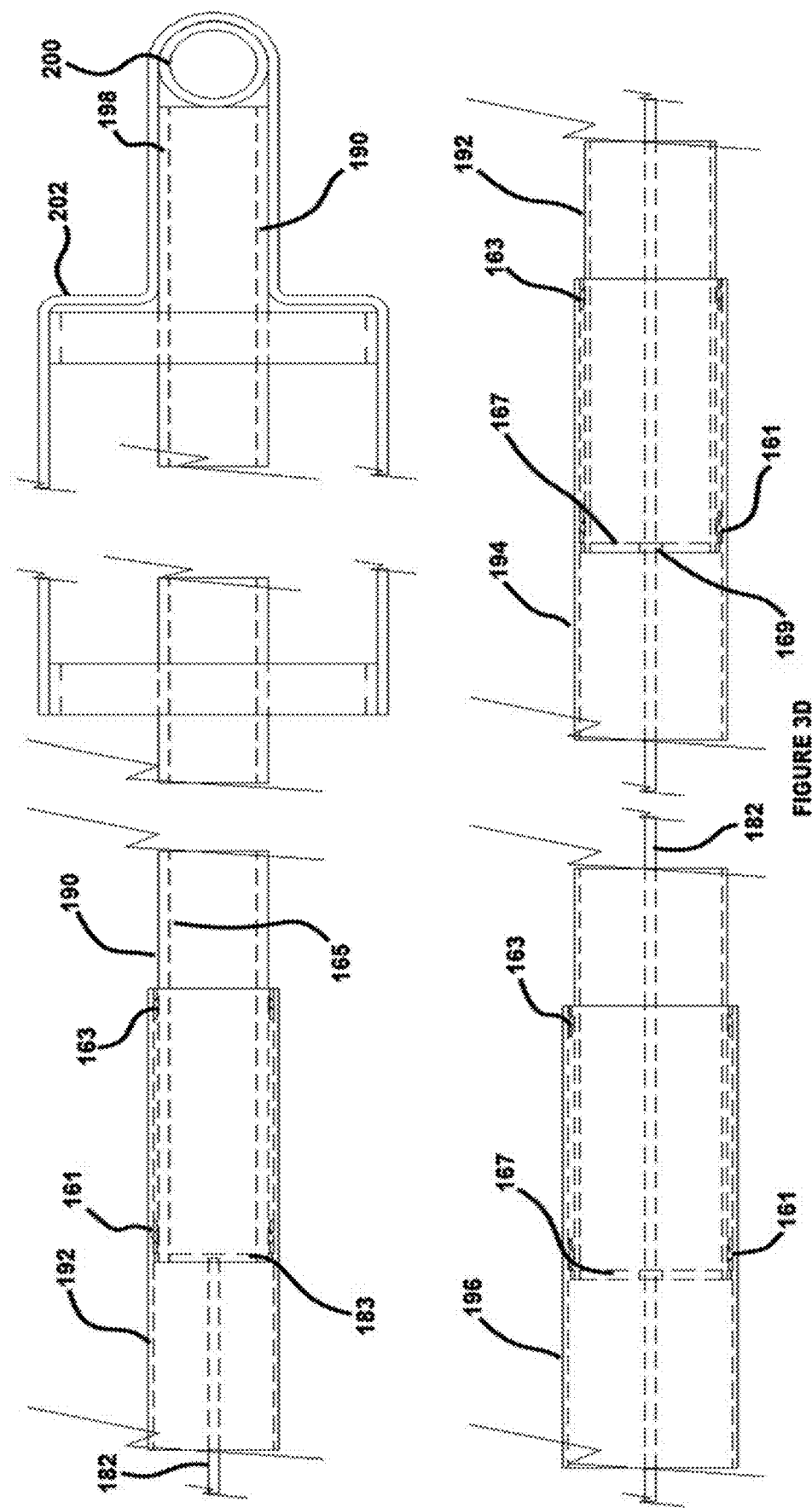
FIG. 3D shows side views of telescoping tubes of the present disclosure.

Coiled strip 182 extends and retracts due to the action of extension/retraction motor 170 through extension/retraction gear assembly 172 to cause coiled strip 182 to uncoil and push upon telescoping tubes 186 via pushing on plate 183 formed at proximal end 185 of distal tube 190, see FIG. 3B. FIG. 3 shows telescoping tubes 186 in a retracted/nested position 188 wherein the tubes are nested within one another, much like Russian nesting dolls. Telescoping tubes 186 are sized such that a distal tube 190 resides within the diameter of an adjacent tube 192, which in turn resides within a next adjacent tube 194, with this progression continuing until a final or last, proximal tube 196, which forms the last tube in the progression. The nested tubes may be affixed to one another or simply placed in frictional engagement. In one embodiment, a proximal end engagement mechanism 161, which may be in the form of a lip, such as a fixed structure such as a ridge or washer, on the exterior of the proximal end of the inner tube and a distal end engagement mechanism 163, such as a fixed structure like a ridge or a washer, on interior of the distal end of the tube in which it is nested, see FIG. 3D, may be placed on the exterior of distal tube 190 so that it cannot extend beyond the end of adjacent tube 192, this configuration may be used on all tubes in the nested configuration to prevent them from becoming disengaged from one another during use. Coiled strip 182 may be affixed to the interior 165 of distal tube 190 or may be attached to distal tube plate 183, via welding, crimping, adhesive, etc., as known to those of skill in the art, such that extension and retraction of coiled strip 182 causes movement of distal tube 190. Other than distal tube 190, the other nested tubes may employ an access plate 167 with an access opening 169 that allows coiled strip 182 to pass through the distal end of each tube and progress along the interior of each tube.

In the case of extension, coiled strip 182 would push distal tube 190 "outward" or "right" with respect to the nested tubes. Extension of distal tube 190 would then cause extension of adjacent tube 192, such as by distal engagement mechanism 161 of distal tube 190 encountering proximal engagement mechanism 163 of adjacent tube 192, which will cause distal tube 190 to pull adjacent tube 192 from the nested configuration. In turn, adjacent tube 192 would act on next adjacent tube 194 in the same manner with its distal engagement mechanism 161 engaging the proximal engagement mechanism of next adjacent tube 194. This progression continues until all tubes are extended from the nested configuration, with the exclusion of proximal tube 196 which is fixed to sunshade extension/retraction assembly 168 to hold proximal tube 196 in place to serve as an anchor and support for the tube configuration. With respect to distal end 198 of distal tube 190, distal end 198 engages cross tube 200, which extends perpendicularly to telescoping tubes 186. Distal end 198 may simply abut cross tube 200 or may be affixed to same via welding, mechanical fasteners, etc. Distal end 198 and cross tube 200 are both contained in cuff 202. Distal sunshade hanger 199 is affixed to distal end 203 of cuff 202 via an affixment means 210, such as a hanger, ring, O-ring, woven border, metal insert, plastic O-ring, etc., as known to those of skill in the art for securing the leading edge 378 of sunshade material 180. During extension, distal end of sunshade material 212, which is affixed to distal sunshade material hanger 199, pulls upon the remainder of sunshade material 180, which is affixed to sunshade material hangers 208. Sunshade material hangers 208 slide or roll along the outer surface of telescoping tubes 186 as distal end of sunshade material 212 extends away from sunshade extension/retraction assembly 168.

During retraction, coiled strip 182 is pulled onto strip spool 202 via extension/retraction telescoping motor 170 causing center rotating shaft 206 to rotate and spool coiled strip 182 onto strip spool 202. This in turn causes the fixed end 187 of coiled strip 182 to pull on plate 183 affixed to proximal end 185 of distal tube 190, see FIG. 3B. This causes distal tube 190 to move proximally toward sunshade extension/retraction assembly 168. Upon proximal end 185 of distal tube 190 encountering the proximal end of adjacent tube 192, adjacent tube 192 then proceeds to move toward interior 150. During retraction, cuff 202 serves to gather sunshade material 180 by pushing sunshade material hangers 208 back along telescoping tubes 186. This causes sunshade material 180 to fold, see FIG. 3C, by pushing sunshade material hangers 208, which support sunshade material 180, toward sunshade extension/retraction assembly 168. Further, in one embodiment, two nested tube configurations as described for FIG. 3 may be employed, one on each side of interior 150 of case 102, in order to provide efficient extension and retraction of the sunshade material 180.

Raising and lowering of sunshade extension/retraction assembly 168 from interior 150 of case 102 may be effectuated via scissor lift 154 acting via first bracket bottom 214 and stationary beam 216 while second bracket bottom 218, which is affixed to plate 220, slides along rod 222, which is affixed to case 102 via shaft support blocks 224. Sliding of second bracket bottom 218 may be aided by a linear bearing assembly 226 which acts on rod 222.

FIG. 3C shows self-contained sunshade in a raised, partially extended configuration. A connector 230, such as a chain, rope, springs, cord, rod, elastic cord, or other materials as known to those of skill in the art for pulling lid 104 shut when sun shade 100 is retracted. Connector 230 also serves to connect sunshade extension/retraction assembly 168 to lid 104 to keep the lid from falling backwards or banging against the vehicle as deployment occurs via a first attachment point 232 and a second attachment point 234.

Figure 4:
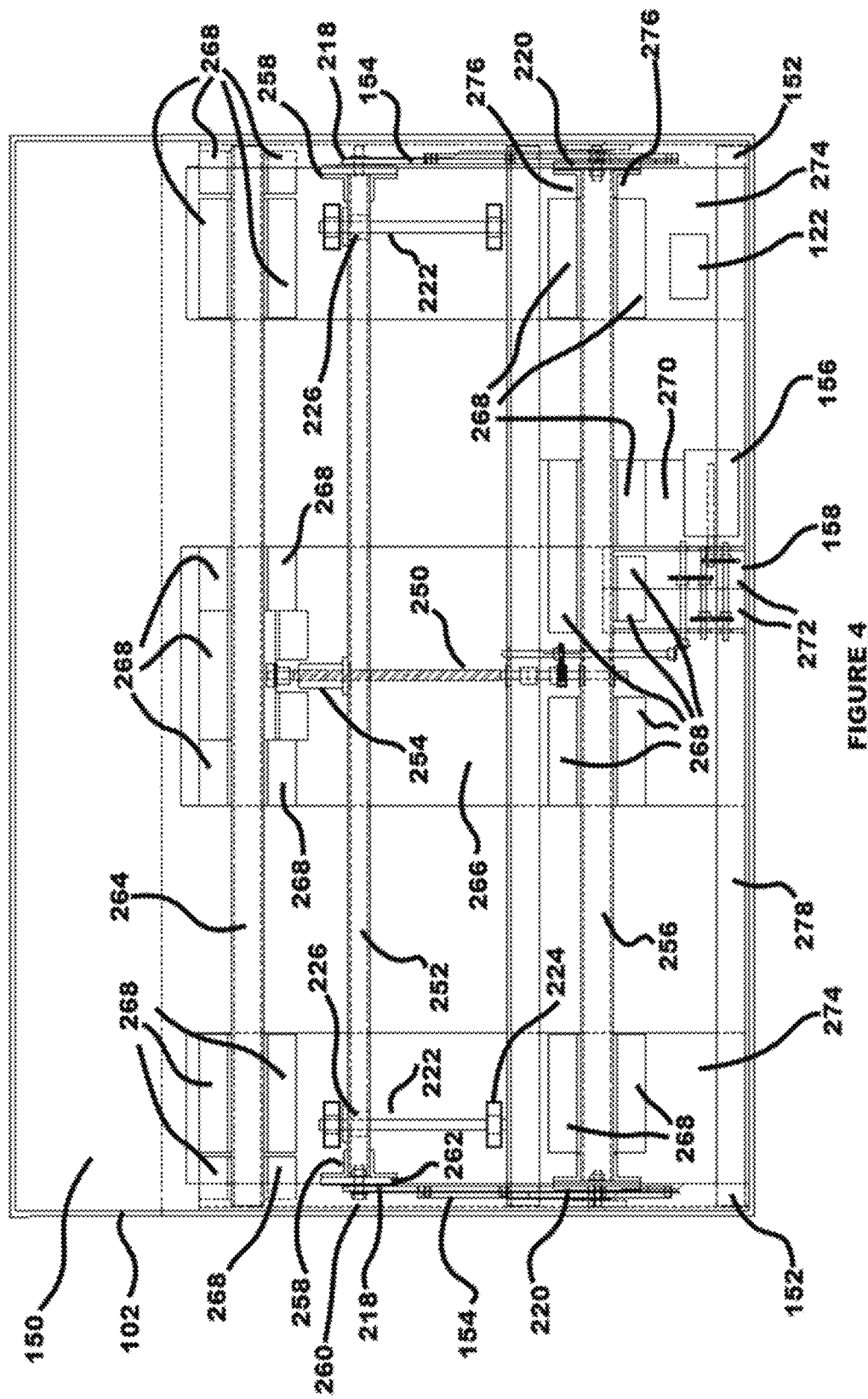
FIG. 4 shows an interior plan view of one embodiment of a case interior of the current disclosure.

FIG. 4 shows an interior plan view of one embodiment of a case interior 150 of the current disclosure. This includes scissor lift brackets 154, scissor lift motor 156, scissor lift bracket gear assembly 158, and battery 122 for raising sunshade extension/retraction assembly 168 from case 102. Motor screw 250, moveable transverse beam 252, lead screw nut 254, and stationary transverse beam 256, which supports Acme motor screw 250, are positioned within interior 150, as well as tube for motor screw anchor 264. Connection angles 258 and plates 262 connect moveable transverse beam 252 to second bracket base 218 via axles 260.

Stability may be provided throughout a series of plates and angles attached throughout case interior 150. For instance, plates may be used to secure the transverse beams running across the width of interior 150 such as gear assembly and screw plate 266 or transverse beam connection angles 268, which may be in the form of right angles or obtuse or acute angles, transverse beam connection angles may be formed from aluminum. Transverse beam connection angles 268 may vary in length as needed for supporting the extension/retraction and lift mechanisms. Additional supports may include motor support plate 270, support plate for gear and drive shafts 272, plates to support lift brackets' moveable arms 274, connection angle for stationary transverse beam to stationary bracket 276, as well as a lateral stability angle 278.

Figure 4B:
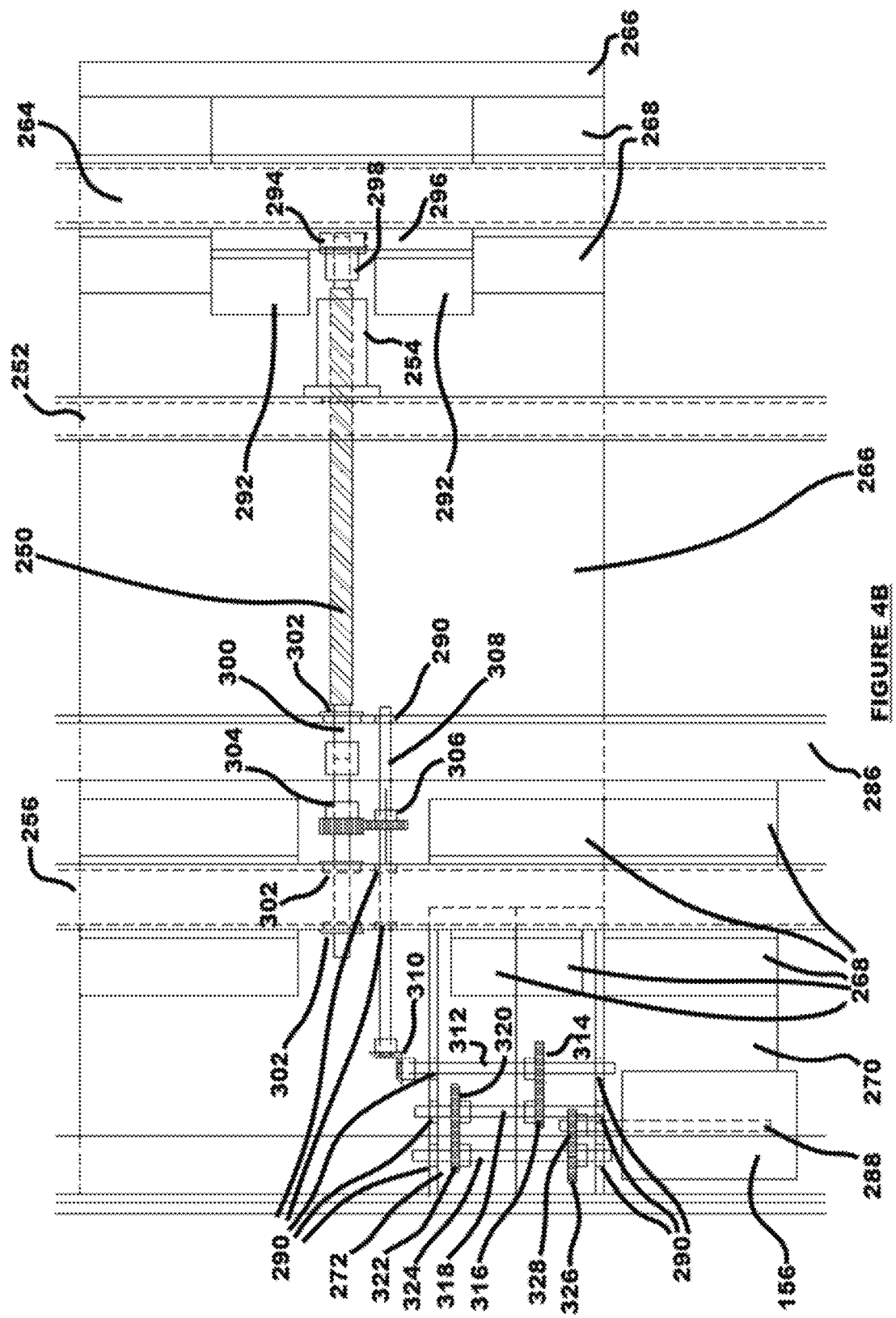
FIG. 4B shows an enlarged view of a section of FIG. 4.

FIG. 4B shows an enlarged view of a section of FIG. 4, which includes interior stability angle 286, shaft of scissor lift bracket motor 288, sleeves to protect rods passing through metal 290, clip angles 292, thrust bearing 294, plate to hold thrust bearing 296, sleeve coupling 298, which serves to join lengths of drive shaft 300, sleeves on drive shaft 302, first shaft gear 304 and first rod gear 306, rod 308 to connect beveled gears 310 to drive shaft 300 via first shaft gear 304 via first rod gear 306, first gear holding rod 312, which holds beveled gears 310, and first flat gear 314, which is engaged with second flat gear 316, which resides on second gear holding rod 318, along with third flat gear 320, which is engaged with fourth flat gear 322, which resides on third gear holding rod 324, fifth flat gear 326 also resides on third gear holding rod 324 and is engaged with sixth flat gear 328, which resides on shaft of scissors lift bracket motor 288.

FIG. 4C shows a second enlarged view of a section of FIG. 4, which shows that stationary transverse beam 256 may be secured to scissor lift brackets via bolt 340.

Figure 5:
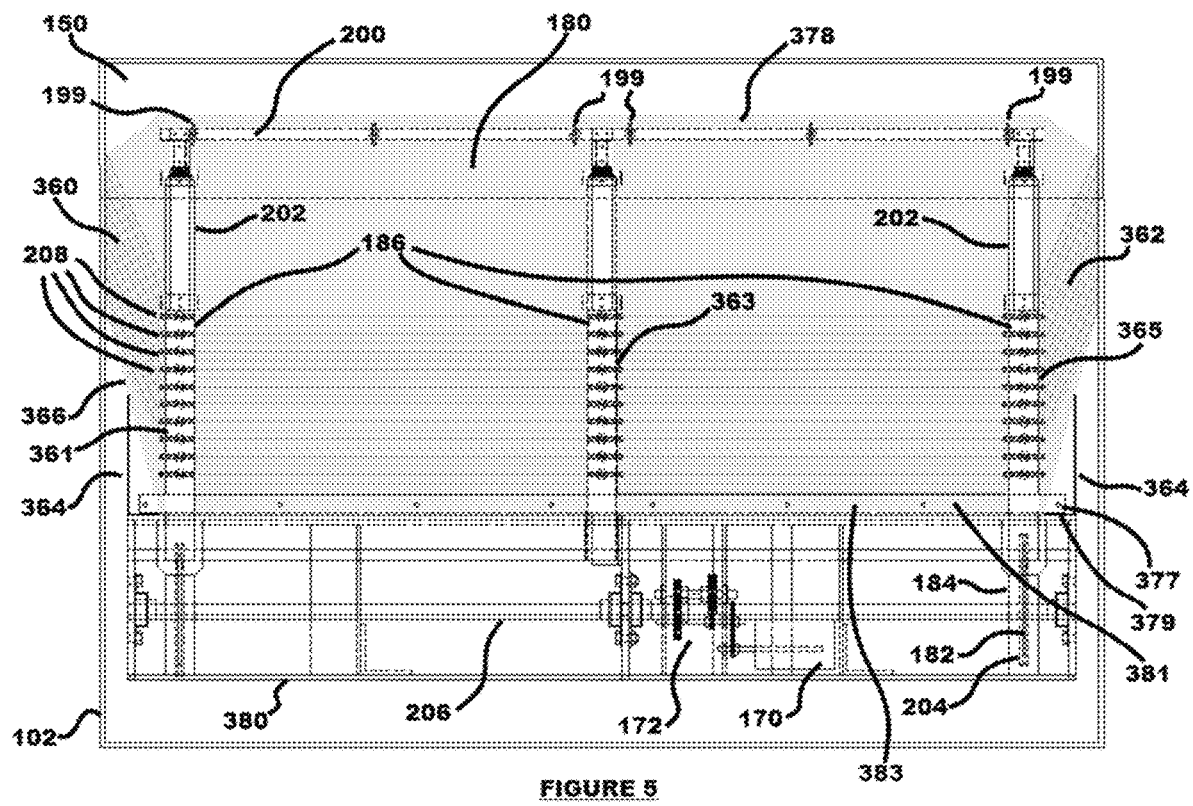
FIG. 5 shows a downward view of an interior of a self-contained sunshade with sunshade material shown in a retracted position and folded configuration.
Figure 5B:
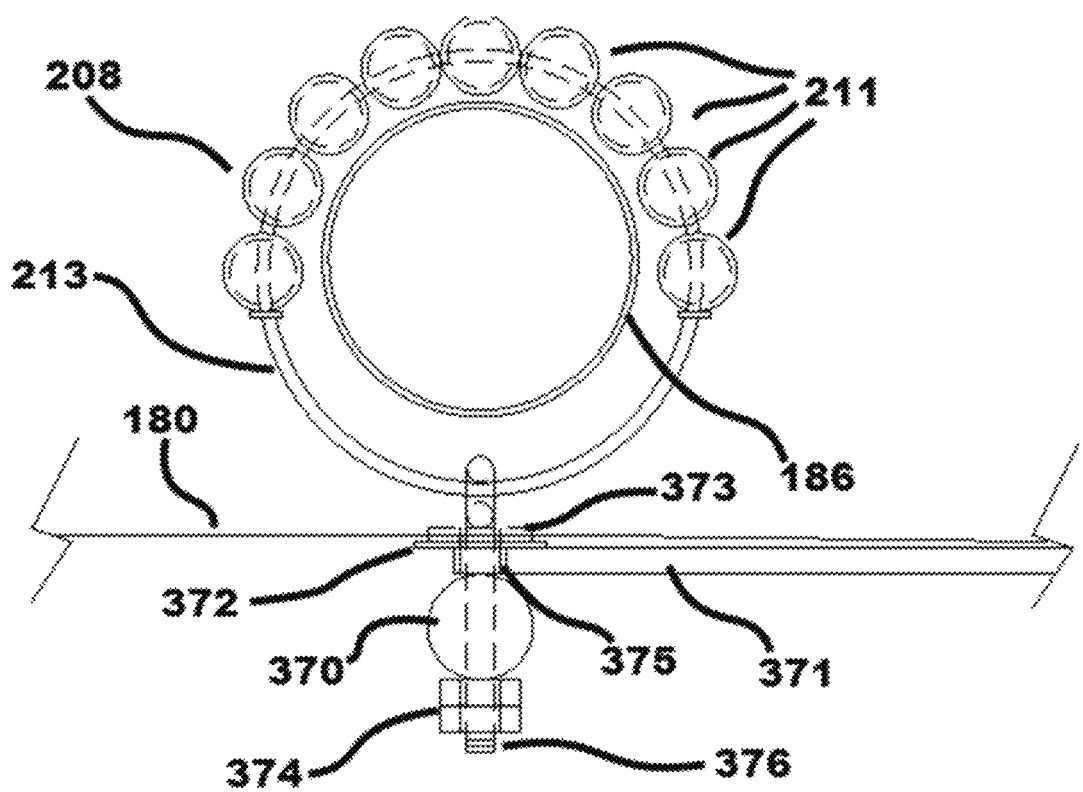
FIG. 5B shows a close-up view of one embodiment of a sunshade material hanger of the present disclosure.

FIG. 5 shows a downward view of interior 150 of self-contained sunshade 100 with sunshade material 180 shown in a retracted position 360 sunshade material 180 in a folded position 362. During retraction, shields 364 act upon outer "wing" section 366 of sunshade material 180 to cause same to swing or angle forward when sunshade material 180 is in folded position 362. During deployment, wing section 366 may extend over the roof of the vehicle and beyond the edge of telescoping tubes 186 to the "left" and "right" of the self-contained sunshade 100. Sunshade material 180 is supported on telescoping tubes 186 by sunshade material hangers 208, which may comprise woven borders, metal inserts, plastic O-rings, etc., as known to those of skill in the art for strengthening the openings created in sunshade material 180. Sunshade material 180 may be affixed in place via a fabric attachment 377, such as a ringed hole 379 which may be in the form of a fabric angle 381 in order to secure the proximal end 383 of sunshade materials FIG. 5B shows a close-up view of one embodiment of a sunshade material hanger 208, which shows hanger 208 may include a ring 213 that supports a series of swivel members 211, which may be ball bearings or other members capable of engaging telescoping tube 186 and rolling or moving to allow hanger 208 to slide along telescoping tube 186. Sunshade material 180 may be retained in place on hanger 208 via engagement between a support 370 and washer, or other means, 372. Support 370 may be secured in place via nuts 374 or other means as known to those of skill in the art via a threaded shaft 376 which runs through sunshade material 180 and engages with hanger 208. Additionally, stay 371 may be attached around threaded bolt. Stay 371 may be used on the outer telescoping tubes in order to keep wing section 366 in a straightened position when in folded position 362, stay 371 may be contained in a pocket in sunshade material 180, not shown. Telescoping tubes 186 may be further defined as first outer tube 361, middle tube 363, and second outer tube 365. In addition, a grommet 373 may be employed to allow suspension of sunshade material 180 without damaging the fabric or material by inserting hanger 208 through grommet 373.

Referring again to FIG. 5, leading edge 378 of sunshade material will not collapse into folded position 362 but will instead remain positioned distally beyond folded position 362 due to being suspended from distal sunshade hanger 199. Extension/retraction mechanism housing 380 serves to enclose the extension/retraction equipment and protect same from the elements as well as encases the mechanism to separate it from sunshade material 180 in order to avoid entangling sunshade material 180 or contacting same and making it dirty or imparting oil or grease to the sunshade material 180.

Figure 5C:
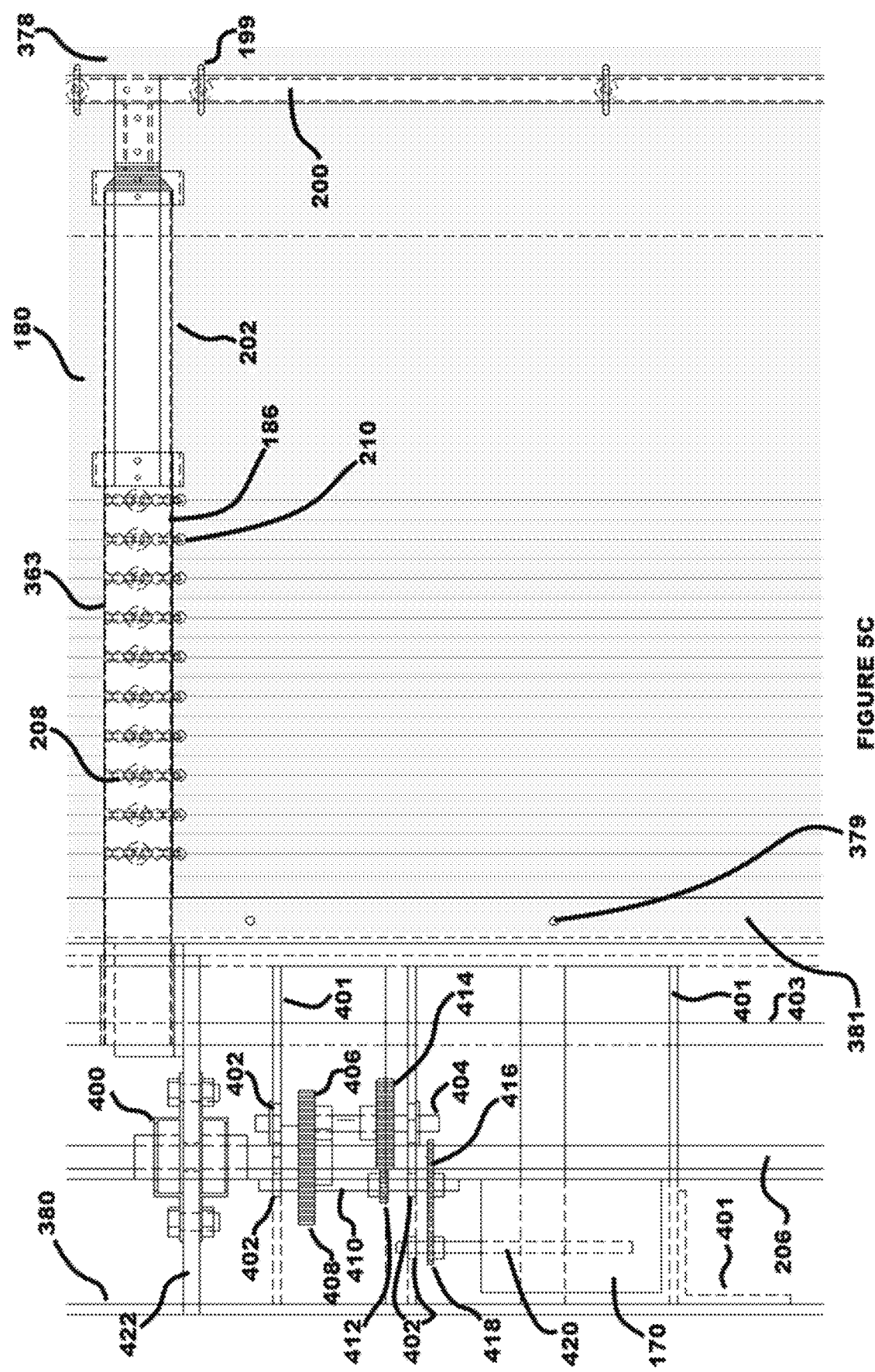
FIG. 5C shows an enlarged view of a section of FIG. 5.

FIG. 5C is an enlarged view of a section of FIG. 5. FIG. 5C shows center rotating shaft bearings 400, multiple support angles 401 may be employed to strengthen and provide support for the extension/retraction mechanism, width-wise support angle 403 may also be employed, rod bearings 402 for first extension rod/shaft 404 which contains first extension gear 406 which engages second extension gear 408, which is positioned on second extension rod 410, which also has third extension gear 412, which engages fourth extension gear 414, which is positioned on first extension rod 404, second extension rod 410 also includes fifth extension gear 416, which engages sixth extension gear 418, positioned on telescoping motor drive shaft 420 which extends from telescoping motor 170. Center rotating shaft plate 422 may be provided to stabilize the extension/retraction structure. In addition a center telescoping tube support angle 424 may be included to further stabilize middle tube 363.

Figure 6:
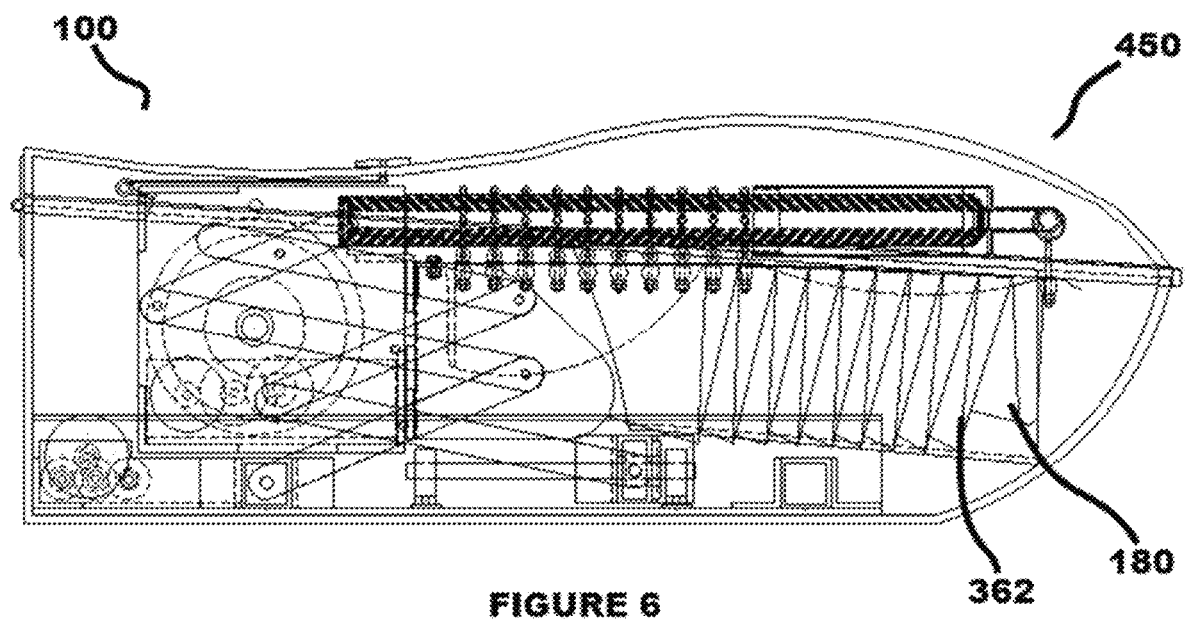
FIG. 6 shows a side profile view of self-contained sunshade in a closed configuration wherein sunshade material is in a folded position 362.
Figure 6B:
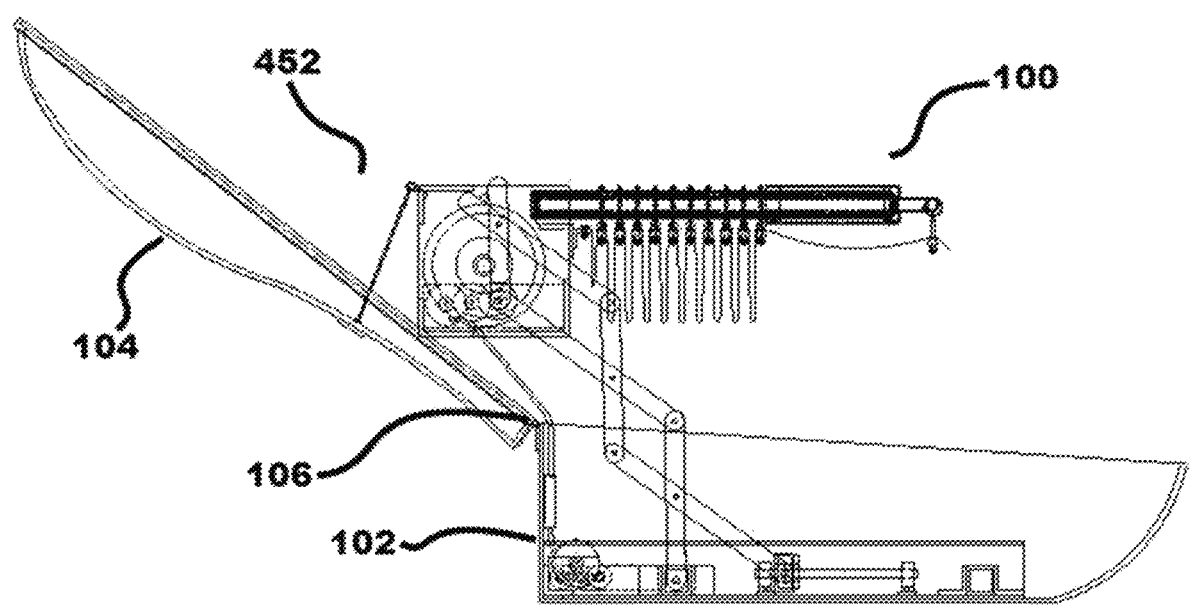
FIG. 6B shows a side profile view of self-contained sunshade in an open configuration wherein the case is opened and the case lid is supported by the case lid hinge and positioning chains.
Figure 6C:
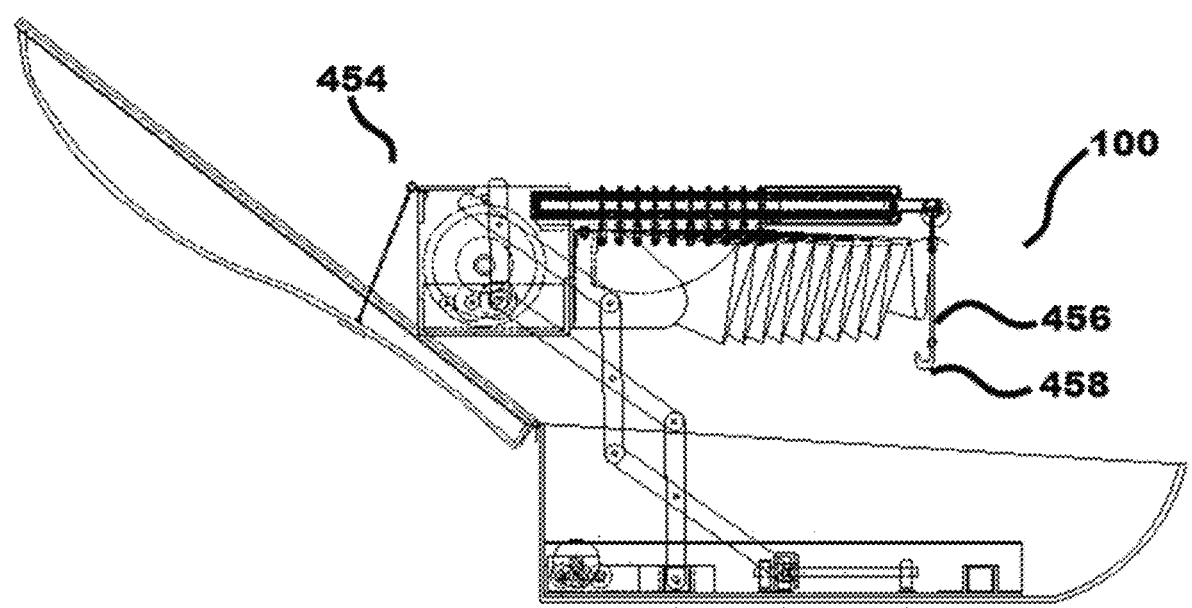
FIG. 6C shows a side profile view of self-contained sunshade in a partially extended configuration.
Figure 6D:
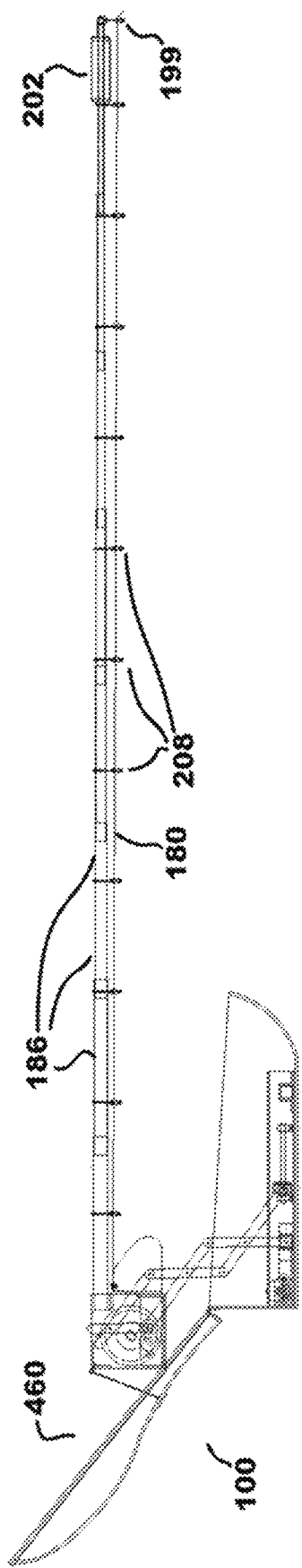
FIG. 6D shows a side profile view of self-contained sunshade in a fully extended configuration, wherein the telescoping tubes are fully extended and sunshade material is fully extended and supported.

FIG. 6 shows self-contained sunshade 100 in closed configuration 450 wherein sunshade material 180 is in folded position 362. FIG. 6B shows self-contained sunshade 100 in open configuration 452 wherein case 102 is opened and case lid 104 is also open and supported by case lid hinge 106, in a further embodiment chain 109 may also be affixed, singly or in pairs or more, to further help support lid 104. FIG. 6C shows self-contained sunshade 100 in partially extended configuration 454 and shows stabilizing cord 456 and hook 458 for securing sunshade 100 when in use such as by hooking the extended sunshade material 180 to a portion of the vehicle. FIG. 6D shows self-contained sunshade 100 in fully extended configuration 460, wherein telescoping tubes 186 are fully extended and sunshade material 180 is also fully extended and supported by distal sunshade hanger 199 and hangers 208.

Figure 7B:
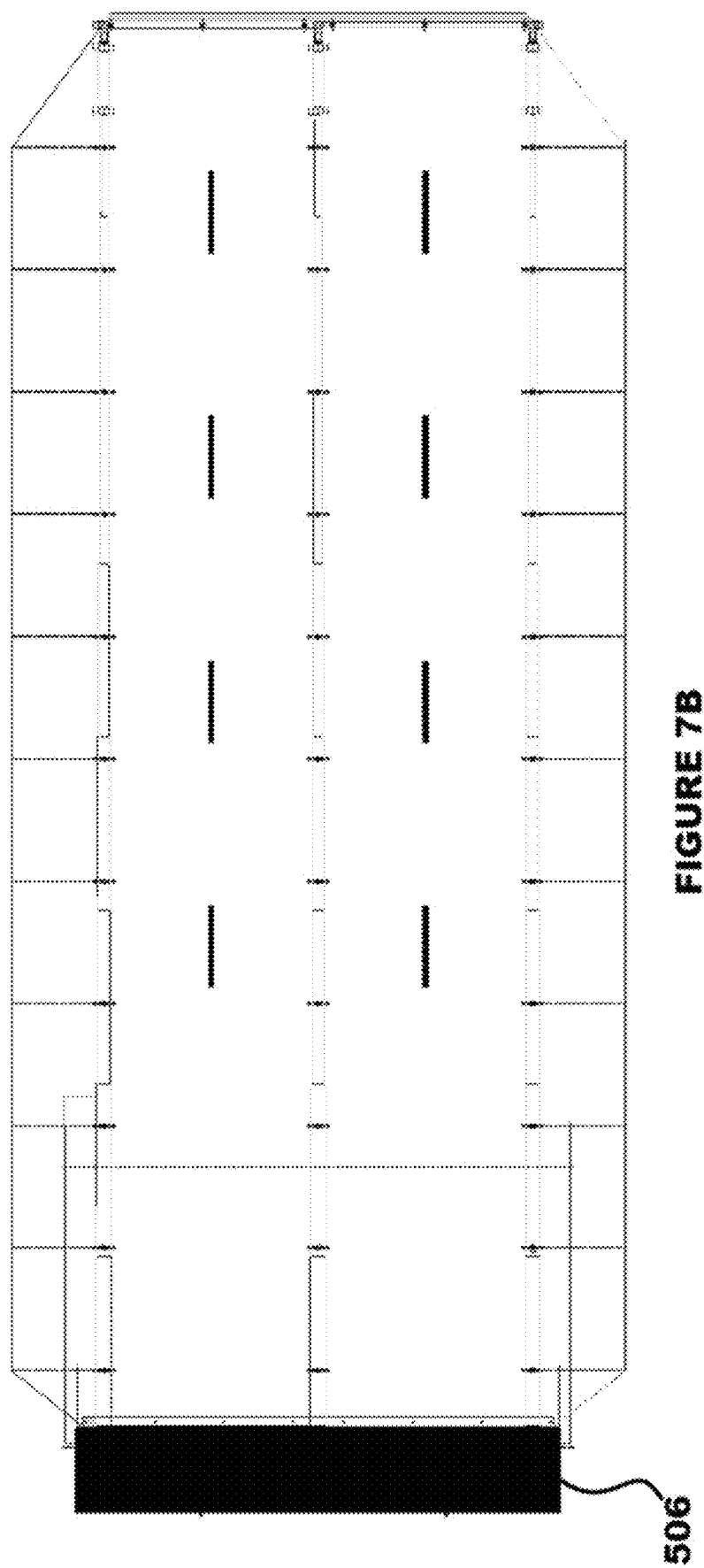
FIG. 7B shows a top down view of a shade material of the current disclosure fully extended along with a weather cover.

FIG. 7 shows sunshade material 180 extended via telescoping tubes 186. In addition to sunshade material 180, which may be comprised of materials as described supra, sunshade material 180 may include drainage holes/air vents 500. Rings 502 may be used to reinforce openings 504 defined by drainage holes/air vents 500. FIG. 7B shows a further embodiment of sunshade material 180 extended wherein weather cover 506 is included to cover the internal parts of the device.

FIG. 8 illustrates a table from the American Automobile Association of vehicle interior temperatures versus elapsed time. The current disclosure would be inherently valuable to automobile users. As FIG. 8 shows, internal temperatures in an automobile may climb to 115° F. on a mild day with temperature of only 70° F. Much higher temperatures are achieved as ambient temperature increases.

In one embodiment, the current disclosure provides a car-shading apparatus that is self-contained, self-supporting, and self-extending. A user has only to press a button, such as button on a remote control, to unlock case 102 and start the circuitry-controlled deployment of sunshade material 180. In the event that remote-control is not available, the same functions can be accessed inside a door 100, on a side or rear 108 of case 102, a user may also access a battery 122 to power two motors 156 and 170 and switch 130 to change power sources to the car's twelve-volt battery for recharging with cord 120 or to a solar cell. The rear of the case has ventilation openings 124 for moisture control in the event of rain. The assembly may be made rigid with aluminum connection plates, such as 220, 262, 266, 270, 274, 296, 422, and 434, and connection angles, such as 258, 268, 272, 276, 278, 286, 292, 401, and 403. Most of the sunshade parts may be made of aluminum to reduce weight.

When activated, scissor lift motor 156 turns a gear assembly 158 that is calibrated to open the entire device in approximately 30 seconds. Gear assembly 158 turns an Acme screw 250 which passes through a lead screw nut 254 into coupling 298 and into a thrust bearing 294. The threaded shaft of the Acme lead screw 250 turns inside of the lead screw nut 254 and moves a horizontal transverse beam 252 backwards and forwards. An unthreaded portion of drive shaft 300 passes through a stationary transverse beam 256. Movable transverse beam 252, which contains a linear bearing assembly 226 near each end, slides back and forth upon rods 222 affixed between support blocks 224. Both transverse beams have bolts or axles 260 that join them rotatably to the two bottom members of scissors lift brackets 154. As the moving transverse beam 252 slides on its rods 222, lift brackets 154 are raised and angle backward for greater shade coverage. Lift brackets 154 hold an extension/retraction assembly 168 that supports and deploys sunshade material 180. Extension/retraction assembly 168 has a lug 107 on each end, clamped onto by the ascending scissors lift bracket members, that prevents rocking forward or backward due to weight or wind. Lugs 107 keeps the brackets from fully extending, which would weaken them. The rising extension-retraction housing 168 pushes the case lid 104 open and backward, which is then secured by chains 109 between the lid and housing.

When the brackets are raised, the scissors lift bracket motor stops and the second motor, telescoping motor 170, contained in the extension-retraction housing 168, turns extension/retraction gear assembly 172 to rotate a center rotating shaft 206, which may be formed from steel or another material more durable than aluminum. Center rotating shaft 206 has two strip housings 184, one at each end of extension-retraction housing 168, which hold a spool each of coiled strip 182. When the center rotating shaft 206 rotates, coiled strips 182 fastened to it unwind to push into a series of telescoping tubes 186. There are three sets of telescoping tubes. The center set is for preventing fabric sag. Inside of the two outer sets of tubes 186, one set on each side, coiled strips 182 unwind, pushing through an access opening 169 in access plate 167 at the proximal end of each tube and fastened to the plate of the proximal end of the distal or smallest tube 190. Access openings 169 reduce the up and down flexing and rotation of coiled strips 182. Distal or smallest tubes 190 are fastened to a horizontal cross tube 200 crosswise at the end of the telescoping tubes 186 for support and bracing and for pulling out the center set of the telescoping tubes.

Sunshade material 180 hangs from the telescoping tubes by means of affixment means 210 which may include swivel members 211. In one embodiment, see FIG. 5B, affixment means 210 may comprise ring 213, which may be stainless steel, passing through several swivel members 211, which in one instance may comprise pierced balls, for easy movement and a lower end-threaded shaft, which may resemble an eye-bolt, 376 which passes through a grommet 373 in the shading fabric and holds grommet 373; a washer 372; stays 371 wrapped around small stainless steel bushings 375, for wing sections 366; support 370 to reduce friction; and two locking nuts 374. Sunshade material 180 may be made of UV protection fabric that is designed to reduce the car interior heat about twenty degrees Fahrenheit. As telescoping tubes 186 are pushed out by coiled strips 182 and sunshade material 180 is deployed, side "wings" or wing sections 366 swing out to the sides to offer additional sun protection coverage. Wing sections 366 are held from sagging by stays 371 mounted around bushings on the shafts below the rings 264 and may be inserted into pockets, not shown, in the extension parts of the fabric cover.

When retraction activator 136 is pressed to activate the sunshade retraction, coiled strips 182 pull telescoping tubes 186 into a nested position as telescoping motor 170 reverses the movement of the rotating shaft 206. As the tubes retract into a nested position 188, sunshade material 180 is gathered as the tubes retract to largest/proximal tube 196 by means of cuff 202, which pushes each fold hanging from a ring into a series of accordion folds for neat storage. Baffles or shields 364 on each side of the extension-retraction housing 168 fold the wing sections 366 forward. Between the cuffs 202 and baffles 364, sunshade material 180 is controlled so that it folds neatly within the case. Once the tubes are fully retracted, the upper telescoping motor 170 stops and the scissor lift motor 156 reverses direction to lower the scissors lift brackets holding the extension-retraction housing 168 with sunshade material 180 down into the case. As the housing is lowered by the scissors lift brackets 154, the chains 109 are engaged to pull the case lid into a closed position. The case relocks after the scissor lift motor 156 stops.

Elastic cords may be provided affixed to the horizontal cross tube 200 at the ends of the telescoping tubes so that one can, if desired, in windy conditions, may pull down a rubberized hook or clamp and affix same to the vehicle wheel well or grill. Also, reinforced vents 500 are provided in the shading fabric for wind dissipation or drainage.

The sunshade unit is designed to sit on a vehicle's roof rack with four rotating locking clamps that will fit regardless of whether a rack is oriented in a transverse or longitudinal direction on the car It can be moved from car to car or easily stored away at the end of the hot summer season.

While the current disclosure is discussed as being associated with a vehicle, the device may be built to be free-standing such that attachment to a vehicle is unnecessary. Thus, the device could be a portable sunshade capable of providing shade with the push of a button.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art using the teachings disclosed herein.

What is claimed is:

1. A vehicle sun shade device comprising: a containment case;
    a housing; a sunshade material;
    at least one vertical extension unit for raising the housing and sunshade material from the containment case up from a vehicle roof;
    at least one horizontal extension unit integrated with the housing, wherein the at least one horizontal extension unit comprises at least one telescoping tube containing a coiled strip, wherein the coiled strip uncoils when the horizontal extension unit extends and the coiled strip recoils when the horizontal extension unit retracts; and
    wherein extension of the at least one horizontal extension unit extends the sunshade material and retraction of the at least one horizontal extension unit retracts the sunshade.

2. The vehicle sun shade device of claim 1 wherein the sunshade material comprises a power source.

3. The vehicle sun shade device of claim 1 wherein the sunshade material comprises a woven or nonwoven material which contains ultraviolet ray protection.

4. The vehicle sun shade device of claim 1 wherein the sunshade material extends over and defines a space between a sunshade canopy and a vehicle roof.

5. The vehicle sunshade device of claim 1, wherein vertical raising of the vehicle sunshade device is achieved via at least one scissor bracket.

6. The vehicle sunshade device of claim 1, wherein the sunshade material is supported from the at least one telescoping tube.

7. The vehicle sunshade device of claim 1, wherein the coiled strip comprises a coiled metal strip.

8. The vehicle sunshade device of claim 1, wherein the at least one telescoping tube is comprised of segments nested within one another.

9. The vehicle sunshade device of claim 8, wherein the coiled strip is connected to a distal-most segment of the telescoping tube.

10. The vehicle sunshade device of claim 1, wherein upon retraction of the sunshade material, the sunshade material is gathered by a cuff.

11. The vehicle sunshade device of claim 1, wherein vertical and horizontal movement of the device is accomplished via at least one motor.

\* \* \* \* \*